Patented July 29, 1952

UNITED STATES PATENT OFFICE 2,605,294

1,4-DIBROMO-2,3-DICHLORO-2-BUTENE

William S. Barnhart, Akron, Ohio, assignor to The Firestone Tire & Rubber Company, Akron, Ohio, a corporation of Ohio No Drawing. Application June 2, 1949, Serial No. 96,821

6 Claims. (Cl. 260—654)

This invention relates to 1,4-dibromo-2,3-dichloro-2-butene. It includes the compound and its preparation. The compound is a lachrymator.

The new compound is prepared by bromination of 2,3-dichlorobutadiene-1,3 as indicated by the following equation:

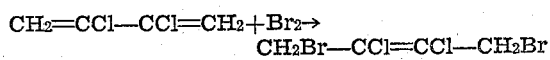

There are two stereoisomeric forms of the new compound. At room temperature one is liquid and one is solid. Both forms are lachrymators.

The compound may be prepared by mixing solutions of bromine and 2,3-dichlorobutadiene-1,3 and allowing them to react at about room temperature. The reaction is exothermic and the solution will usually be cooled so as to be maintained at a temperature under about 50° C. Ordinarily, an excess of bromine will be used. Temperatures lower than room temperature may be used, but this is not feasible commercially. Higher temperatures may be employed, but commercially temperatures not over 80° C. will be used.

Alternatively, the compound may be made by adding bromine continuously or in increments to a solution of 2,3-dichlorobutadiene-1,3.

Ordinarily the dichlorobutadiene and bromine will be dissolved in different portions of the same solvent before reacting. Any usual organic solvent relatively inert to bromination may be used, such as saturated hydrocarbons free from tertiary hydrogen atoms, e. g. n-heptane, neopentane, etc., and chlorinated hydrocarbons of the order of carbon tetrachloride, ethylene dichloride, chloroform and the like. Commercially chloroform is preferred.

Example 1

Six moles of bromine in 300 ml. of chloroform was slowly added at 25° C. to 3 moles of 2,3-dichlorobutadiene-1,3 in 500 ml. of chloroform. The reaction is exothermic and external cooling was employed to maintain the temperature. The reaction was completed in about 1 hour. The excess bromine was removed by reaction with ethylene. The resulting mixture was fractionated and the reaction product was recovered as liquid and solid isomers. The liquid isomer has the following characteristic properties: M. P. 17° C.; B. P. 125° C. at 25 mm.; $d_4^{20}$ 2.051; $n_D^{20}$ 1.593. The solid isomer has a melting point of 35° C.

Both of the isomers were found to be quite lachrymatory and trouble was experienced in working with them even in an efficient hood.

*Identification.*—The structure of the compound was proven by oxidation. Forty-seven and four-tenths grams (0.3 mole) of potassium permanganate was added in one hour, with stirring, to a mixture of 28.3 g. (0.1 mole) of 1,4-dibromo-2,3-dichloro-2-butene and 100 ml. of water. The solution was filtered. Sulfur dioxide was passed through the solution until it was clear. It was extracted with ether for 9 hours. The ether extract was dried two hours with $Na_2SO_4$, and the ether evaporated. A solid was obtained which had a melting point of 47–48° C., boiling point of 205–208° C. (corrected), and a neutral equivalent of 137.7. The compound was thus identified as bromoacetic acid.

Example 2

Thirty and eight-tenths grams (0.25 mole) of 2,3-dichlorobutadiene-1,3 and 100 ml. of carbon tetrachloride were placed in an Erlenmeyer flask. A solution containing 48 g. (0.3 mole) of bromine in 150 ml. of carbon tetrachloride was prepared. About 5 ml. of the bromine solution was added to the solution in the flask. The bromine color persisted for 5 minutes. When the flask was gently warmed on the steam bath the color disappeared. Once the reaction started the addition of bromine was rapid up to the point corresponding approximately to the addition of 1 mole $Br_2$ to 1 mole of the dichlorobutadiene. Beyond this point the reaction became slow, and hydrobromic acid was evolved.

The next day, unreacted bromine was still present. The reaction mixture was concentrated by evaporating the carbon tetrachloride and excess bromine by means of a stream of air. The product was a mixture of solid and liquid 1,4-dibromo-2,3-dichloro-2-butene, yellow in color and highly lachrymatory.

What I claim is:

1. 1,4-dibromo-2,3-dichloro-2-butene.
2. A mixture of 1,4-dibromo-2,3-dichloro-2-butene isomers.
3. Solid 1,4 - dibromo - 2,3 - dichloro-2-butene isomer.
4. Liquid 1,4 - dibromo - 2,3-dichloro-2-butene isomer.
5. The process of producing 1,4-dibromo-2,3-dichloro-2-butene which comprises reacting bromine with 2,3-dichlorobutadiene-1,3.
6. The process of producing 1,4-dibromo-2,3-dichloro-2-butene which comprises reacting an excess of bromine with 2,3-dichlorobutadiene-1,3 in chloroform between room temperature and 50° C.

WILLIAM S. BARNHART.

REFERENCES CITED

The following references are of record in the file of this patent:

UNITED STATES PATENTS

| Number | Name | Date |
| --- | --- | --- |
| 1,965,369 | Carothers et al. | July 3, 1934 |

OTHER REFERENCES

Beilstein, "Handbuch der organishen Chemie," vol. I, First Supplement, page 85.

Chem. Abstracts 38, 330² (1944).